United States Patent Office 3,394,137
Patented July 23, 1968

3,394,137
N-PENTACHLOROPHENYL PIPERAZINE
DERIVATIVES
Elton K. Morris, Midland, Mich., assignor to The Dow
Chemical Company, Midland, Mich., a corporation of
Delaware
No Drawing. Filed Dec. 5, 1966, Ser. No. 598,893
7 Claims. (Cl. 260—268)

ABSTRACT OF THE DISCLOSURE 4-(pentachlorophenyl) - 1 - trichloroacetyl - piperazine and pentachlorophenyl - piperazine compounds having the formula

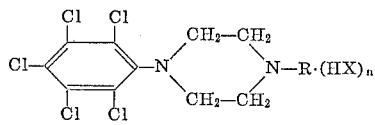

wherein R represents hydrogen, lower alkyl, allyl or ethyl carboxymethyl, HX represents a mineral acid or a straight chain monofunctional organic acid and $n$ represents one of the integers 0 or 1. These compounds are useful as pesticides.

---

The present invention is directed to novel N - (pentachlorophenyl)piperazine compounds and more particularly to a group consisting of 4-(pentachlorophenyl)-1-trichloroacetyl - piperazine and pentachlorophenyl-piperazine compounds having the formula

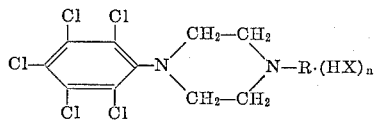

In the present specification and claims, R represents hydrogen, lower alkyl, allyl or ethylcarboxymethyl, HX represents a mineral acid or a straight chain monofunctional organic acid and $n$ represents one of the integers 0 or 1. The term "lower alkyl" as employed herein refers to an alkyl group containing from 1 to 2, to 3, to 4 carbon atoms. Representative alkyl groups include methyl, ethyl, propyl, or butyl. The compounds of the present invention are crystalline solids which are of varying degrees of solubility in water and are usually soluble in many common organic solvents. The N-(pentachlorophenyl) piperazine derivatives are useful as pesticides for the control of various pests such as algae, insects, helminths, fungi and aquatic plants. Representative pests include cockroaches, ascarids, trichostrongylides, root-knot nematodes, coontail, elodia and salvinia.

The N-(pentachlorophenyl)piperazine compound of the present invention is prepared by reacting hexachlorobenzene and anhydrous piperazine. The reaction proceeds readily at temperatures of from 110° to 175° C. and preferably at 130° to 145° C. The proportions of the reactants to be employed are not critical, some of the desired product being produced when the reactants are employed in any proportions. While the reaction consumes the reactants in equimolar proportions and the reaction will proceed when such proportions are employed, it is preferred that 3 to 4 molar proportions of piperazine be employed for each molar proportion of hexachlorobenzene.

In carrying out the production of the N-(pentachlorophenyl)piperazine, hexachlorobenzene and piperazine, preferably anhydrous piperazine, are mixed in any order or fashion. The reactants can be contacted in the presence of an inert organic solvent such as xylene, toluene or benzene, however, the use of a solvent is not necessary. Following the mixing of the reactants the reaction mixture is heated at a temperature within the desired temperature range for a period of from 4 to 24 hours and preferably from 6 to 12 hours. During the reaction period, it is desirable that the reaction mixture be agitated in order to prevent the reaction mixture from separating into two immiscible layers. Following the reaction period, the reaction mixture is successively washed with water in order to extract any unreacted piperazine and hydrochloride salts. Upon washing out the unreacted piperazine and hydrochloride salts, the water-insoluble residue is separated by filtration and extracted with a hot aqueous solution of a weak monofunctional organic acid. Representative acids include acetic acid, formic acid, propionic acid, lactic acid or butyric acid. Following the extraction with the weak mono-functional acid, the accumulated acid extracts are treated with an excess of sulfuric acid to precipitate the N-pentachlorophenyl piperazine product in the form of its sulfate salt, thus separating it from soluble by-products. The solid precipitate is thereafter filtered and washed. The washed precipitate is then dispersed and digested in an aqueous solution of an excess of base such as ammonium hydroxide, methylamine, ethylamine, ethylenediamine, or inorganic bases such as sodium hydroxide, potassium hydroxide or sodium carbonate and the like, filtered and the filter cake washed with a dilute alkaline solution until no sulfate ion is found in the wash filtrate. When non-volatile bases are employed the cake must then be water-washed to remove excess alkali and when the inorganic bases are employed, exposure to elevated temperatures should be avoided. The washed cake of solid N-(pentachlorophenyl)piperazine product is then dried.

The 1 - lower alkyl-4-(pentachlorophenyl)piperazine compounds of the present invention are prepared by reacting N-(pentachlorophenyl)piperazine, formic acid and saturated aliphatic aldehyde in the presence of a catalyst. In the preparation of the 1-lower alkyl-4-(pentachlorophenyl)piperazines good yields of the desired product are obtained when the reaction is carried out at a temperature of from 50° to 90° C. Optimum yields of the desired product can be obtained when the reactants are contacted in a ratio of piperazine, to aldehyde, to formic acid, to catalyst, of 1 to 2, to 3, to 0.1 and such ratios are conveniently employed. However, the reactants can be contacted in a ratio of 1 to 1.1, to 2.1 to 0.1 with the production of the desired product. Representative saturated aliphatic aldehydes include formaldehyde, acetaldehyde, propionaldehyde and butyraldehyde.

In carrying out the production of the 1-lower-alkyl-4-(pentachlorophenyl)piperazine, the N - (pentachlorophenyl)piperazine, formic acid, aldehyde and catalyst are dispersed in water as the reaction medium. Representative catalysts include calcium chloride, magnesium chloride, and barium chloride. The reaction mixture is maintained at a temperature within the desired temperature range until there is a substantial cessation in the production of carbon dioxide and conveniently for a time of from 2 to 8 hours. Following the heating period, a base such as ammonium hydroxide or sodium hydroxide is added to the reaction mixture to raise the pH thereof to at least 9. During the adjustment of the pH, the product precipitates in the reaction mixture as solid material. This solid product is then separated by filtration and washed with dilute base to remove excess formaldehyde, acid and chloride salt. The washed product can then be employed in pesticidal applications or further purified by recrystallization from organic solvents such as acetone, benzene, hexane or methanol before being so employed.

In another procedure, the washed product is further purified by dissolving it in warm dilute hydrochloric acid and thereafter precipitating the product, by addition of excess sodium hydroxide or ammonium hydroxide.

The pentachlorophenyl piperazine salts of the present invention are prepared in accordance with known procedures. In such procedures a pentachlorophenyl piperazine corresponding to the formula

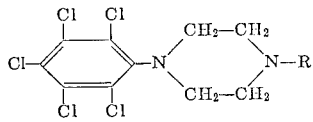

is reacted with the acid producing the desired salt. Representative acids include mineral acids such as hydrochloric, hydrobromic, hydroiodic, sulfuric, nitric, and monofunctional organic acids such as acetic, propionic, formic and butyric. In carrying out the production of the salt the pentachlorophenyl piperazine is dispersed in an organic solvent, preferably acetone, and the desired salt-producing acid added to the dispersion containing the pentachlorophenyl piperazine. While acetone is preferred, other solvents such as methylene chloride, and carbon tetrachloride can be employed. When the salt-producing acid is not soluble in acetone, said acid is dissolved in a suitable solvent and the acid-containing solvent solution admixed with a dispersion containing the pentachlorophenyl piperazine. The reactants are employed in equimolar amounts or with a slight excess, up to 10 percent, of the desired acid. When employing mineral acids such as sulfuric or nitric it is desirable to dilute the concentrated acid with from two to four volumes of water in order to prevent undesirable side reactions. Following the addition of the salt-producing acid it may be necessary to heat the solution slightly in order to bring all of the acid into solution. In most cases during the addition of the acid the desired salt product will begin to precipitate as a crystalline solid, which upon the cessation of the precipitation can be separated by filtration. In those instances where the salt does not precipitate completely in the reaction mixture, precipitation can be increased by diluting the reaction mixture with a hydrocarbon solvent such as pentane or hexane. The product thus precipitated is collected by centrifugation, filtration or decantation and dried. In an alternate procedure, the reaction mixture can be subjected to evaporation or flash distillation to remove the low boiling constituents and obtain the product salt as a solid residue.

The 1-(pentachlorophenyl)-4-trichloroacetyl piperazine compound of the present invention is prepared by reacting N-pentachlorophenyl piperazine and ethyltrichloroacetate in the presence of an inert organic solvent as reaction medium. The reaction proceeds readily at temperatures of between 0° C. and 100° C. The proportions of the reactants to be employed are not critical, some of the desired product being obtained when the reactants are contacted together in any proportions. However, optimum yields are obtained by employing the ethyl trichloroacetate and N-pentachlorophenyl piperazine in substantially equimolar proportions.

In carrying out the preparation of the 1-(pentachlorophenyl)-4-trichloroacetyl piperazine, the ethyl trichloroacetate and N-pentachlorophenyl piperazine are mixed together in any order or fashion in an inert organic solvent. Representative inert organic solvents to be employed as reaction medium include methanol, benzene, acetone, and hexane. Following the contacting of the reactants the temperature of the reaction mixture is maintained in the desired temperature range for a short period of time. Following the reaction period the volume of the reaction mixture is reduced in order to initiate the precipitation of the desired product. The desired product is thereafter separated from the concentrated reaction mixture by such conventional procedures as filtration, decantation or centrifugation.

The 1-allyl-4-(pentachlorophenyl)piperazine is prepared by reacting N-pentachlorophenyl piperazine with allyl chloride or allyl bromide. The reaction is carried out at temperatures of from 0° C. to 80° C. with production of the desired product. While the reaction consumes the reactants in substantially equimolar proportions optimum yields of the desired product are obtained when the reactants are contacted together in a molar excess of the allyl halide.

In carrying out the production of the 1-allyl-4-(pentachlorophenyl)piperazine hydrochloride salt the N-pentachlorophenyl piperazine and excess allyl chloride are contacted together in a pressure bomb. The contents of the bomb are then heated to drive out air, whereupon the bomb is capped and heated at the desired temperature for a period of from about 24 to 72 hours. Thereafter, the crude 1-allyl-4-(pentachlorophenyl)piperazine hydrochloride salt product is removed from the reaction bomb as a solid material.

The crude material removed from the bomb is dissolved in a minimum amount of water and the resulting solution thereafter treated with ammonium hydroxide to obtain the free base which is thereafter extracted with benzene. The benzene extracts are thereafter distilled to remove the low boiling constituents and obtain an oily residue which is then dissolved in hot methanol. The methanol solution is made acidic by the addition of hydrochloric or acetic acid. It may be necessary to add water and methanol to the acidic mixture to maintain a homogeneous system. This system is heated at temperatures between 0° C. and 100° C. and sodium nitrite added to the system. During the reaction it may be necessary to add additional hydrochloric acid in order to maintain an acidic environment thus allowing for the conversion of any unreacted N-(pentachlorophenyl)piperazine to the corresponding nitroso compound. Following the heating period, the reaction mixture is filtered to remove any solid material and the filtrate made basic with ammonia and extracted with benzene. The benzene extract is thereafter distilled to remove the low boiling constituents and obtain the crude 1-allyl-4-(pentachlorophenyl)piperazine as an oily residue. The 1-allyl-4-(pentachlorophenyl)piperazine is dissolved in acetone and the acetone solution treated with gaseous hydrogen chloride. Following the addition of the hydrogen chloride, the 1-allyl-4-(pentachlorophenyl)piperazine hydrochloride is separated from the reaction mixture by conventional procedures such as diluting the reaction mixture with $n$-pentane to induce crystallization.

While 1-allyl-4-(pentachlorophenyl)piperazine is obtained in the above procedure, in a preferred procedure it is prepared from the 1-allyl-4-(pentachlorophenyl)piperazine hydrochloride. In such a procedure, the 1-allyl-4-(pentachlorophenyl)piperazine hydrochloride is dissolved in a minimum amount of methanol. The pH of the methanol solution is then made basic by the addition of an alkali metal hydroxide such as sodium or potassium hydroxide. The basic mixture is then diluted with water and allowed to stand until crystallization is complete. The crystalline solid 1-allyl-4-(pentachlorophenyl)piperazine free base is thereafter separated by filtration.

The 4-(pentachlorophenyl)-1-piperazine-acetic acid ethyl ester product also named 1-ethylcarboxymethyl-4-(pentachlorophenyl)piperazine, is prepared by reacting N-pentachlorophenyl piperazine and ethyl-chloroacetate in the presence of ethanol as reaction medium. The reaction proceeds readily at temperatures of from 10° C. to 80° C. and preferably at temperatures of from 50° C. to 80° C. The reactants are employed in substantially equimolar proportions, however, such proportions are not critical for obtaining at least some of the desired product.

In carrying out the preparation of the 1-ethyl-carboxymethyl-4-(pentachlorophenyl)piperazine the reactants are mixed together in any order or fashion and the temperature of the resulting reaction mixture maintained within the desired temperature range for a short period of time. Following the reaction period the reaction mixture is concentrated by conventional procedures such as evaporation of the low boiling constituents. During the concentration procedure, a crystalline solid by-product precipitates and is removed by filtration. The filtrate thus obtained is concentrated to dryness to obtain a crystalline solid residue which is thereafter recrystallized from acetone.

The following examples are merely illustrative and are not intended to be limiting.

Example 1

Hexachlorobenzene (286 grams; 1 mole) and anhydrous piperazine (344 grams; 4 moles) are contacted together with stirring. Thereafter, stirring is continued and the reaction mixture heated at 135° to 145° C., for 8 hours. During the heating period, a solid material precipitates in the reaction mixture. Upon completion of the heating period, the reaction mixture is washed with hot water several times to extract the water-soluble unreacted piperazine and hydrochloride salts. The residual solid, water-insoluble, crude product remaining is then separated from the washed reaction mixture by filtration and the filtered solid extracted with hot 10 percent aqueous acetic acid and filtered. The filtrate, consisting of the acetic acid extract is mixed with a 10 percent excess of 1/1 (vol.) aqueous sulfuric acid and the resultant solid precipitate is filtered and washed thoroughly with dilute sulfuric acid. The washed solid precipitate is then dispersed and digested in about 4 liters of dilute aqueous ammonium hydroxide solution to precipitate the N-(pentachlorophenyl)piperazine product. The ammonium hydroxide solution is then filtered to remove the solid product which is thereafter washed with dilute ammonium hydroxide until the wash liquor is free of sulfate ion. The washed N-(pentachlorophenyl)piperazine product is dried in a vacuum oven at 80° C. and the dried product found to melt at 127°–128° C.

Example 2

N-(pentachlorophenyl)piperazine (501.8 grams; 1.5 moles) was dissolved in 2 liters of warm water containing formic acid (207.0 grams; 4.5 moles). The solution thus prepared was filtered to remove any trace of insoluble material. To the filtered solution was added, with stirring, 230 milliliters of 36–38 percent aqueous formaldehyde solution (sp. gr. 1.085; 3.07 mole) and calcium chloride (16.6 grams; 0.15 mole) and the resultant mixture diluted with water to bring the total volume up to 3.5 liters. This solution was allowed to remain at room temperature for 3 hours, heated at 75°–80° C. for 3 hours and thereafter then heated at from 60°–75° C. for an additional 65 hours. Following the heating period, the reaction mixture was cooled to room temperature and the pH of the reaction mixture brought to pH 9 by the addition of ammonium hydroxide. During the addition of the ammonium hydroxide the 1-methyl-4-(pentachlorophenyl)-piperazine product precipitated in the reaction mixture. This precipitate was separated by filtration and washed free of formaldehyde, formic acid and calcium chloride with dilute ammonium hydroxide. The filtered product was twice recrystallized from 2.5 liters of cold acetone and thereafter, recrystallized from 6 liters of cold acetone (−50° C.). The crystalline solid 1-methyl-4-(pentachlorophenyl)piperazine thus obtained melted at 84°–86° C.

In a similar procedure, the following compounds of the present invention are prepared.

1 - ethyl - 4 - (pentachlorophenyl)piperazine (molecular weight 362.47) by reacting N-(pentachlorophenyl)-piperazine, acetaldehyde and formic acid with magnesium chloride as catalyst.

1 - propyl-4-(pentachlorophenyl)piperazine (molecular weight 3.76.49) by reacting N-(pentachlorophenyl)pipera- zine, propionic aldehyde and formic acid with barium chloride as catalyst.

1 - butyl-4-(pentachlorophenyl)piperazine (molecular weight 390.57) by reacting N-(pentachlorophenyl)piperazine, butyraldehyde and formic acid with calcium chloride as catalyst.

Example 3

N-(pentachlorophenyl)piperazine (50.19 grams; 0.15 mole) was dissolved in 75 milliliters of methylene chloride. To this solution was added 9.59 grams (0.16 mole) of acetic acid dissolved in 25 milliliters of methylene chloride. Within 15 to 20 seconds after contacting the reactants, rapid precipitation of the desired product began to occur. Upon the cessation of precipitation, the N-(pentachlorophenyl)piperazine acetate product was removed from the reaction mixture by filtration and dried in a vacuum oven at 85° C. The dried N-pentachlorophenyl)piperazine acetate product melted at 172.5°–173.5° C.

Example 4

N-(pentachlorophenyl)piperazine (33.49 grams; 0.10 mole) was dissolved in methanol, filtered to remove trace insoluble material, and the resulting solution added slowly with stirring to a solution of ethyl trichloroacetate (19.2 grams; 0.10 mole) dissolved in methanol. Following the addition of the N-(pentachlorophenyl)piperazine solution the reaction mixture stood at room temperature for about 1½ hours whereupon it was heated to 62° C. and thereafter allowed to cool to room temperature. The reaction mixture was thereafter filtered and the filtrate concentrated. During the concentration procedure 10 milliliters of ethyl trichloroacetate was added. During the concentration procedure and subsequent to the final addition of ethyl trichloroacetate the 1-(pentachlorophenyl)-4-trichloroacetyl piperazine product precipitated as a crystalline solid. The mixture containing the precipitate was allowed to stand overnight. This precipitate was separated by filtration, washed with methanol, heated to boiling in methanol, cooled slowly, filtered and again washed with methanol. The resulting material was then extracted in hot acetone, cooled, filtered and dried to give a crystalline solid 1-(pentachlorophenyl)-4-trichloroacetyl piperazine product melting at 148°–148.5° C.

Example 5

N-(pentachlorophenyl)piperazine (34.2 grams; 0.1 mole) is reacted with allyl chloride (90.5 grams; 1.0 mole) at a temperature of 80° C., and under superatmospheric pressure for 40 hours. Following the reaction period, the crude material obtained from the reaction vessel is dissolved in a minimum amount of water, the aqueous solution made basic by the addition of ammonium hydroxide. Addition of the ammonium hydroxide results in the formation of an emulsion which is extracted with benzene. The benzene extract is distilled to remove the low boiling constituents and obtain an oily residue which is thereafter dissolved in hot methanol. To the methanol solution thus obtained, acetic acid and excess aqueous hydrochloric acid are added and the resulting mixture heated at 80° C. During the heating period water and methanol are added to the acidic mixture in order to maintain the material in solution. The reaction mixture thus prepared is heated at about 80° C. for 12 hours with sodium nitrite and concentrated hydrochloric acid being periodically added. During the reaction period a precipitate formed in the reaction mixture which is thereafter removed by filtration. The filtrate thus obtained is made basic with ammonium hydroxide and extracted with benzene and the benzene extracts heated to dryness to obtain an oily residue. The oily residue thus prepared is dissolved in acetone and the acetone solution thereafter saturated with hydrogen chloride gas. Following the addition of the hydrogen chloride gas the reaction mixture is chilled and diluted with n-pentane. During the dilution procedure a solid material precipitates in the dilute mixture and this precipitate is separated by filtration, washed with a chilled mixture of acetone and n-pentane and finally with n-pentane. The washed 1-allyl-4-(pentachlorophenyl)piperazine hydrochloride product is dried and found to melt at 291°–291.5° C. with decomposition.

Example 6

1-allyl-4-(pentachlorophenyl)piperazine hydrochloride is dissolved in a minimum amount of methyl alcohol. The pH of the solution thus prepared is elevated to between 8.5 and 10 by the addition of sodium hydroxide and the basic solution thus prepared thereafter diluted with water. The addition of the water results in the formation of an emulsion. Upon standing crystalline solid material precipitates from the emulsion. The crystals are removed by filtration, washed with water and dried. The dried 1-allyl-4-(pentachlorophenyl)piperazine product is found to melt at 62°–63° C.

Example 7

Ethyl chloroacetate (12.58 grams; 0.10 mole) was dissolved in ethanol and the resulting solution added with stirring to a solution of N-(pentachlorophenyl)-piperazine (33.63 grams; 0.10 mole) in a mixture of acetone and ethanol. The reaction mixture thus prepared was allowed to stand overnight at room temperature. Thereafter, an additional 10 milliliters of ethyl chloroacetate was added to the reaction mixture and the resulting mixture heated at the boiling point until the volume was decreased from about 400 milliliters to about 200 milliliters. During the concentration procedure a crystalline solid material precipitated in the reaction mixture. This crystalline solid material was removed from the reaction mixture by filtration and the filtrate concentrated to dryness to obtain a crystalline solid residue which was dissolved in hot acetone. Thereafter, the acetone solution was chilled to −50 C. During the cooling procedure crystalline solid materials precipitated in the chilled acetone. The crystals were collected by filtration and twice more recrystallized from acetone as above and finally washed with cold n-pentane (−50° C.), and dried at 75° C. The 1-ethylcarboxymethyl-4-(pentachlorophenyl)piperazine thus prepared was found to melt at 83–84° C.

Example 8

N-(pentachlorophenyl)piperazine (50.19 grams; 0.15 mole) was dissolved in 75 milliliters of methylene chloride. To this solution was added with stirring a solution of acetic acid (9.59 grams; 0.16 mole) in 25 milliliters of methylene chloride. Within 30 seconds after the solutions were mixed the N-(pentachlorophenyl)-piperazine acetate product began to precipitate in the reaction mixture. Upon the completion of the precipitation the reaction mixture was filtered to obtain the solid product. The N-(pentachlorophenyl)piperazine acetate product was air dried and then oven dried at 85° C. and the dried product found to melt at 172°–173° C.

In a similar fashion the following compounds of the present invention are prepared.

N-(pentachlorophenyl)piperazine butyrate (molecular weight 420.50) by reacting together N-pentachlorophenyl)piperazine and butyric acid.

N-(pentachlorophenyl)piperazine sulfate (molecular weight 430.06) by reacting together N-(pentachlorophenyl)piperazine and sulfuric acid.

N-(pentachlorophenyl)piperazine nitrate (molecular weight 396.41) by reacting together N-(pentachlorophenyl)piperazine and nitric acid.

1-methyl-4-(pentachlorophenyl)piperazine acetate (molecular weight 407.46) by reacting together 1-methyl-4-(pentachlorophenyl)piperazine and acetic acid.

1-methyl-4-(pentachloroprophenyl)piperazine formate (molecular weight 393.43) by reacting together 1-methyl-4-(pentachlorophenyl)piperazine and formic acid.

1-methyl-4-(pentachlorophenyl)piperazine hydroiodide (molecular weight 479.33) by reacting 1-methyl-4-(pentachlorophenyl)piperazine and hydroiodic acid.

1-butyl-4-(pentachlorophenyl)piperazine hydrochloride (molecular weight 427.02) by reacting together 1-butyl-4-(pentachlorophenyl)piperazine and hydrochloric acid.

1-ethyl-4-(pentachlorophenyl)piperazine propionate (molecular weight 435.54) by reacting 1-ethyl-4-(pentachlorophenyl)piperazine and propionic acid.

1-ethyl-4-(pentachlorophenyl)piperazine hydrobromide (molecular weight 443.37) by reacting 1-ethyl-4-(pentachlorophenyl)piperazine and hydrobromic acid.

1-propyl-4-(pentachlorophenyl)piperazine propionate (molecular weight 449.56)) by reacting 1-propyl-4-(pentachlorophenyl)piperazine and propinonic acid.

1-butyl-4-(pentachlorophenyl)piperazine sulfate (molecular weight 486.63) by reacting together 1-butyl-4-(pentachlorophenyl)piperazine and sulfuric acid.

1-allyl-4-(pentachlorophenyl)piperazine acetate (molecular weight 447.55) by reacting together 1-allyl-4-(pentachlorophenyl)piperazine and acetic acid.

1-allyl-4-(pentachlorophenyl)piperazine nitrate (molecular weight 436.48) by reacting together 1-allyl-4-(pentachlorophenyl)piperazine and propionic acid.

1-ethylcarboxymethyl-4-(pentachlorophenyl)piperazine formate (molecular weight 465.51) by reacting together 1-ethylcarboxymethyl-4-(pentachlorophenyl)piperazine and formic acid.

1-ethylcarboxymethyl-4-(pentachlorophenyl)-piperazine hydroiodide (molecular weight 548.40) by reacting together 1-ethylcarboxymethyl-4-(pentachlorophenyl)piperazine and hydroiodide.

1-ethylcarboxymethyl-4-(pentachlorophenyl)piperazine hydrochloride (molecular weight 456.95) by reacting together 1-ethylcarboxymethyl-4-(pentachlorophenyl)piperazine and hydrochloric acid The compounds of the present invention can be employed as the toxic constituent in compositions utilized for the killing and control of various algae, insects, helminths, aquatic plants and fungi. In such usage, the compounds are employed in an unmodified form or combined with one or a plurality of adjuvants or helpers including water, organic solvents, petroleum oils and other liquid carriers, surface active dispersing agents and finely divided solids such as chalk, talc or bentonite. The compounds may also be employed in water-in-oil and oil-in-water emulsions.

In representative operations, 1-methyl-4-(pentachlorophenyl)piperazine, when employed as the sole toxic constituent, at a concentration of 500 parts per million gave substantially complete kills of American cockroach (*Periplaneta americana*). In other operations 1-(pentachlorophenyl)piperazine when employed as the sole toxic constituent in aqueous compositions at a concentration of 75 parts per million by weight gave 100 percent control of tomato late blight organisms. In further operations, compositions containing 1-(pentachlorophenyl)-4-trichloroacetyl piperazine or 1-allyl-4-(pentachlorophenyl)piperazine hydrochloride as the sole toxic constituent at a concentration of 200 parts per million by weight give substantially complete kills of *Phytophthora infestans*.

Aqueous compositions containing N-((pentachlorophenyl)piperazine as the sole toxic constituent and at a concentration of 0.5 pound per 100 gallons of ultimate composition gives complete control and kill of *Alternaria solani* (tomato early blight). In such operations the aqueous toxicant-containing composition is sprayed on tomato plants to the point of run off. Thereafter, the plants are inoculated with viable *Alternaria solani* organisms and the plants incubated under conditions optimum for the growth of the disease organism.

I claim:

1. The compound selected from the group consisting of 4-(pentachlorophenyl)-1-trichloroacetyl piperazine and pentachlorophenyl piperazine compounds having the formula

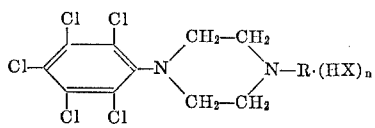

wherein R represents hydrogen, lower alkyl, allyl or ethyl carboxymethyl, HX represents a mineral acid or a straight chain mono-functional organic acid and $n$ represents one of the integers 0 or 1.

2. The compound claimed in claim 1 wherein the pentachlorophenyl piperazine is 4-(pentachlorophenyl)piperazine acetate.

3. The compound claimed in claim 1 wherein the pentachlorophenyl piperazine is N-(pentachlorophenyl)piperazine.

4. The compound claimed in claim 1 wherein the pentachlorophenyl piperazine is 1-methyl-4-(pentachlorophenyl)piperazine.

5. The compound claimed in claim 1 wherein the pentachlorophenyl piperazine is 4-(pentachlorophenyl)piperazine hydrochloride.

6. The compound claimed in claim 1 wherein the pentachlorophenyl piperazine is 1-allyl-4-(pentachlorophenyl)piperazine.

7. The compound claimed in claim 1 wherein the pentachlorophenyl piperazine is 1-methyl-4-(pentachlorophenyl)piperazine hydrochloride.

References Cited

UNITED STATES PATENTS 3,106,557  10/1963  Poppelsdoff et al. ____ 260—268

FOREIGN PATENTS 644,906  7/1962  Canada.

HENRY R. JILES, *Primary Examiner.*